Patented Jan. 3, 1928.

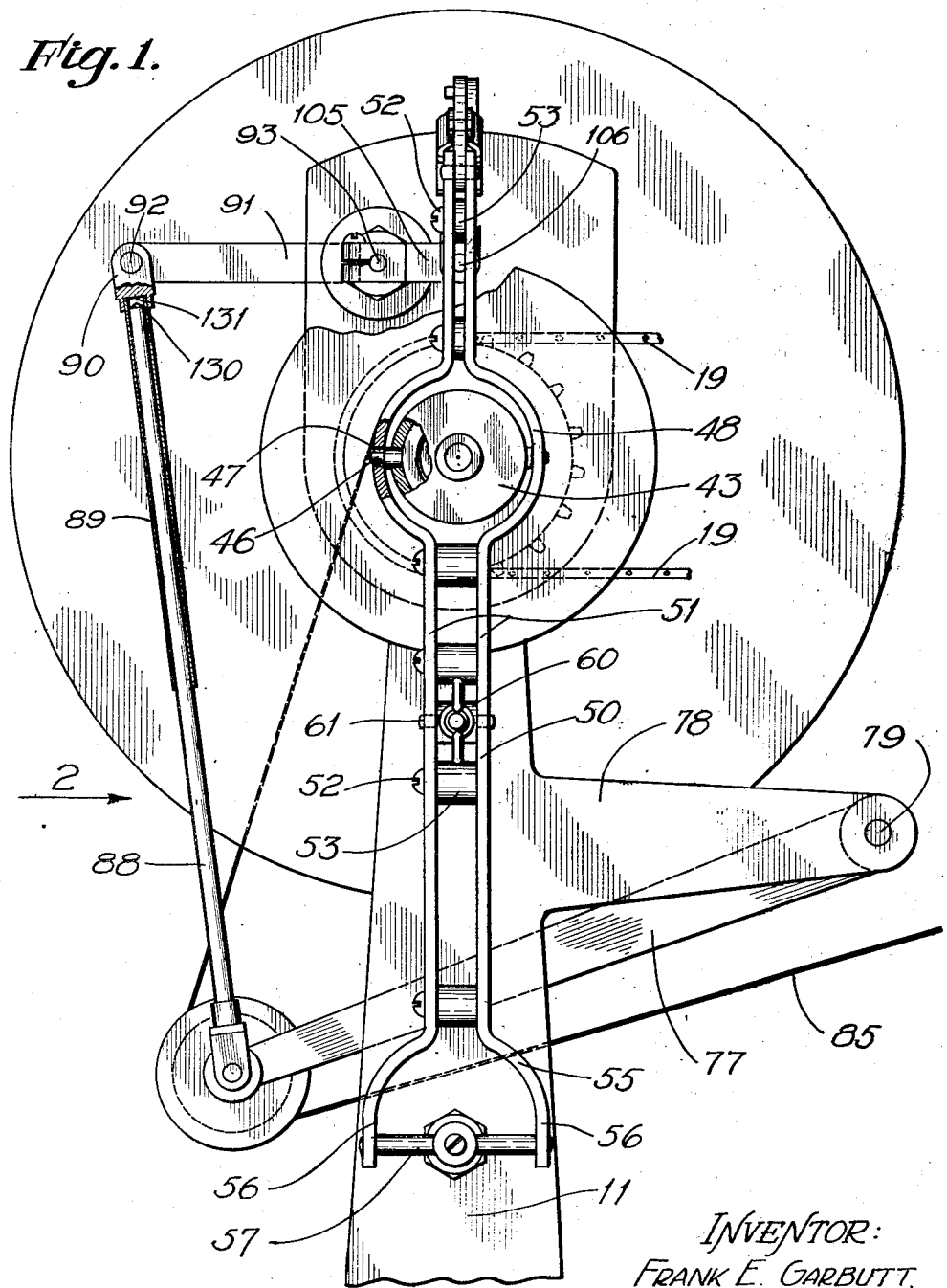

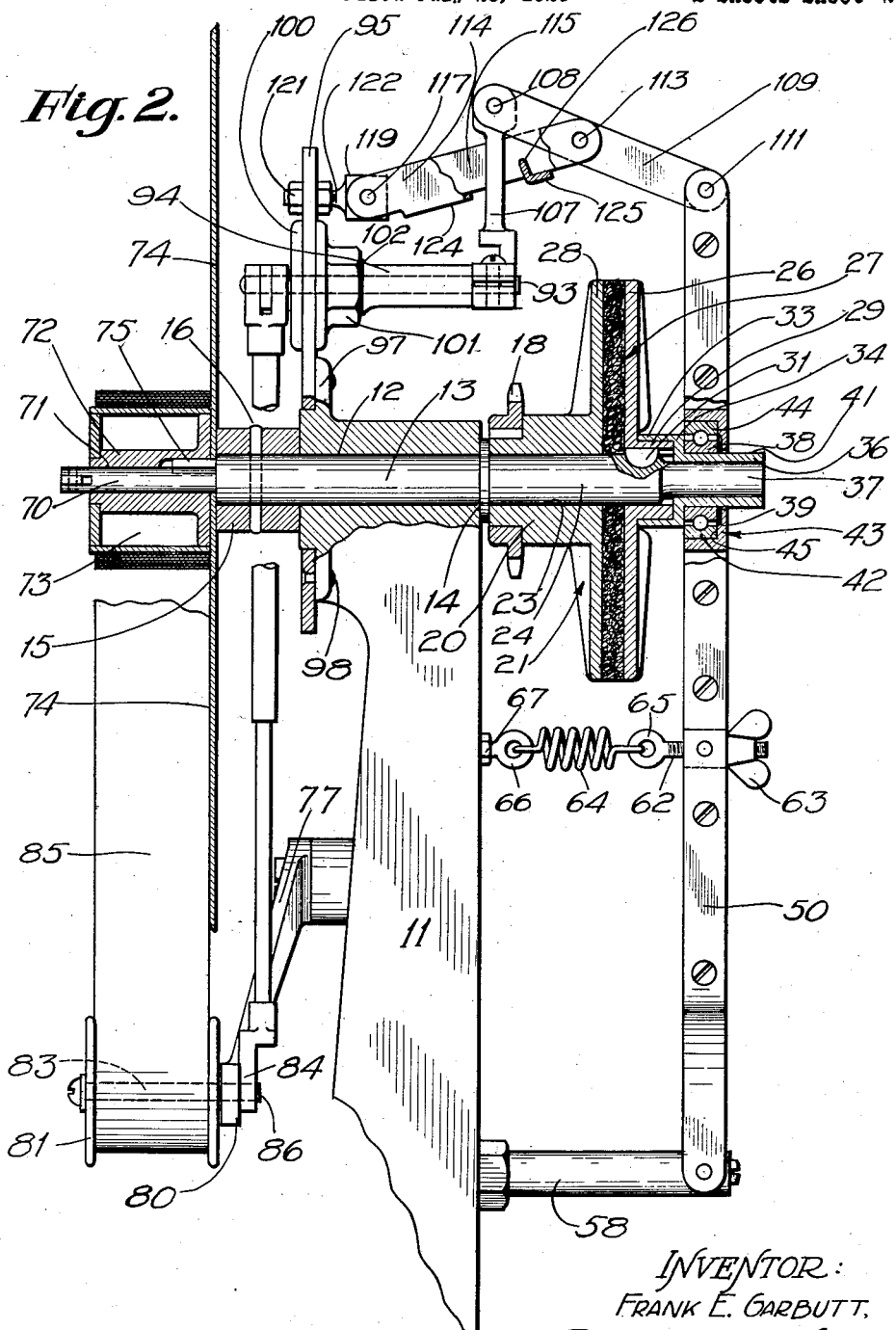

1,654,800

UNITED STATES PATENT OFFICE.

FRANK E. GARBUTT, OF LOS ANGELES, CALIFORNIA, ASSIGNOR TO FAMOUS PLAYERS-LASKY CORPORATION, OF NEW YORK, N. Y., A CORPORATION OF NEW YORK.

FILM-TAKE-UP DEVICE.

Application filed July 25, 1925. Serial No. 46,154.

My invention relates to a device on which film or a similar strip may be wound. My invention, although being particularly useful for handling film, may also be employed for other purposes.

In the film industry a film is conveyed through a series of machines in order to prepare it for market. As the film passes from each machine, it is wound on a reel, which reel is afterwards taken from this machine and transferred to the intake end of the next machine. The film is then passed through this next machine and is wound on another reel as it passes therefrom. The film is thus passed through various machines, being wound upon reels to permit easy transfer to different machines until it is ready for use.

In driving such reels, which must wind up the film at a substantially uniform rate, the speed of rotation of the reel must be varied to reduce the speed of rotation as the film builds up upon the reel and increases the diameter upon which the film is wound and it is an object of my invention to provide means for accomplishing this.

The film is not always fed through these machines at a uniform rate of speed and the film, due to its treatment, stretches and shrinks considerably. The speed at which the film is wound on the receiving reel is determined by the speed at which it passes through the machine, which is greatly affected by the stretch and shrinkage thereof. If the receiving reel rotates too slowly for the film, this film will tangle and a considerable strip of film may be destroyed; and if the reel rotates too fast for the film, the normal tension thereof will be exceeded, which will result in placing detrimental strains on the film or a breakage thereof. If the film is to be handled successfully the receiving reel must rotate at a speed which will maintain a uniform tension on the film.

It is another object of my invention to provide a film winding device which winds a film on a receiving reel at a speed which is determined by the tension of the film. When the tension decreases the reel will be driven faster and as the tension increases the reel will be driven slower, thus compensating for any variation of speed of the film and for any stretch and shrinkage of the film.

It is a further object of my invention to provide a film winding device having a receiving reel which is driven through a clutch, this clutch being operated by a variation in tension of a film being wound on a receiving reel.

It is a still further object of my invention to provide a film winding device having a toggle joint through which the clutch is operated.

It is also an object of my invention to provide a film winding device having a clutch which is retained in driving engagement by resilient means, which is operated by the tension of a film being wound on a receiving reel thereof through mechanism working in opposition to said resilient means.

It is another object of my invention to provide a film winding device having a compensated pulley, the weight of which is carried by a film being wound on a receiving reel of the device, which pulley is adapted to operate clutch mechanism when said pulley is moved, by a variation of tension in the film.

It is an additional object of my invention to provide a film winding device of the character mentioned in which the clutch mechanism is operated only when the compensating pulley moves above a certain position.

Other objects and advantages of the invention will be made evident hereinafter.

Referring to the drawings, which are for illustrative purposes only, and in which I illustrate a preferred embodiment of my invention:

Fig. 1 is an elevational view partially sectioned of a film winding device of my invention.

Fig. 2 is an elevational view partially sectioned of the device shown in Fig. 1, and being taken in a direction indicated by the arrow 2 of Fig. 1.

The form of my invention shown in the drawings comprises a bracket 11 having a bearing 12 which rotatably supports a reel shaft 13. The reel shaft 13 is locked against axial movement by a flange 14 formed integral with the shaft 13 at the right end of the bearing 12 and by a collar 15 which is secured to the shaft 13 by a pin 16 at the left end of the bearing 12. A drive sprocket 18 driven by a sprocket chain 19 is rigidly secured at the left end of a nave 20 of a drive clutch element 21. The drive clutch element 21 has a bearing opening 23 through which a journal portion 24 of the shaft 13 extends. As clearly shown in Fig. 2, the drive clutch element 21 is placed adjacent to the integral flange 14 of the shaft 13. A plate portion 26 of a driven clutch element 27 engages a plate portion 28 of the drive clutch element 21. A hub 29 of the driven clutch element 27 surrounds the outer end of the journal portion 24 of the shaft 13 and is nonrotatably secured thereto by a key 31. This key 31, however, permits an axial movement of the driven clutch element 27 on the shaft 13. A cylindrical portion 33 of a sleeve 34 of the driven clutch element 27 is rigidly placed on the hub 29. Extending outwardly from the portion 33 is a small cylindrical portion 36 of the sleeve 34 which surrounds a reduced end 37 of the shaft 13. An inner race 38 of a ball bearing 39 is pressed on an outer cylindrical face 41 of the sleeve 34. An outer race 42 of the ball bearing 39 is pressed in a cylindrical bearing shell 43 in engagement with a cylindrical face 44 and a radial face 45 thereof. Extending from the bearing shell 43 are diametrically opposed trunnions 46 which operate in vertical slots 47 provided in a yoke portion 48 of a pivot arm 50. The yoke portion 48, as clearly shown in Fig. 1, completely surrounds the bearing housing 43. The pivot arm 50 is composed of a pair of bars 51 which are secured together by screws 52 which extend through spacers 53. The lower end of the pivot bar 50 is provided in the form of a clevis 55 having arms 56, between which a pin 57 extends. The pin 57 passes through an outer end of a pivot bolt 58 which is rigidly secured to the bracket 11. A pivot block 60 is placed between the bars 51 of the pivot arm 50 and has trunnions 61 which extend outwardly through openings in these bars 51. Extending through the pivot block 60 is an eye bolt 62 which has a wing nut 63 threaded on the extending end thereof. A coil spring 64 is attached to an eye 65 of the eye bolt 62 and to an eye 66 of an eye bolt 67 which is secured to the bracket 11. The spring 64 exerts a resilient pull upon the pivot arm 50 which resiliently retains the driven clutch element 27 in engagement with the drive clutch element 21. The tension of the spring 64 on the pivot arm 50 may be adjusted by operating the wing nut 63. A reduced reel end 70 is formed on the left end of the shaft 13 and extends through a cylindrical opening 71 of a hub 72 which forms a part of a receiving reel 73. A radial flange 74 extends from the right end of the hub 72. The receiving reel 73 is locked on the reel end 70 of the shaft 13 by a key 75, as shown in Fig. 2. A compensating arm 77 is pivotally secured to an arm 78 of the bracket 11 by a pivot pin 79. At the free end 80 of the compensating arm 77 a compensating pulley 81 is rotatable on a shaft 83 which extends through the end 80 of the compensating arm 77. A film 85 which is to be wound on the reel 73 is extended around the compensating pulley 81 and then onto the hub portion 72 of the receiving reel 73, as shown in the drawings. A pivot bracket 84 is pivoted on an extending end 86 of the shaft 83. Extending substantially vertically from the pivot bracket 84 is a rod 88. The upper end of the rod 88 extends into a tube 89 which is secured at its upper end to a clevis 90. The clevis 90 is pivotally secured to a free end of a lever 91 by means of a pivot bolt 92. The lever 91 is rigidly secured on a shaft 93 which is rotatably carried in a bearing 94. The bearing 94 is secured to a plate 95 which is rigidly attached to a flange 97 of the bracket 11 by suitable rivets 98. The bearing 94 has a flange 100 which is locked in engagement with the plate 95 by a nut 101 which is threaded on a portion 102 of the bearing 94 which extends from the flange 100 through the plate 95. On an end of the shaft 93 extending from the right end of the bearing 94 there is secured an arm 105. The free end of the arm 105 is pivotally connected by a pin 106 to a connector 107. The connector 107 extends upwardly and is pivotally attached by a pin 108 to the left end of a central toggle link 109. The right end of the toggle link 109 is pivoted on a pin 111 between the extreme upper ends of the bars 51 of the pivot arm 50. A pivot pin 113 extending through side members 114 of a toggle link 115 pivotally secures this link 115 to the central link 109. A pivot pin 117 extending through the side members 114 pivotally secures a left end of the toggle link 115 to a block 119 which is secured to the plate 95 by means of nuts 121 which are threadably secured on an extending pin 122 of the block 119. As clearly shown in Fig. 2, the side members 114 of the link 115 are connected together by webs 124 and 125. Extending from the web 125 is a stop 126 which is engaged by the central toggle link 109 to prevent the toggle members from falling below a certain position.

My invention is suitable for receiving a film or other similar strip from any machine handling same and the operation thereof is substantially as follows:

The film 85 is first extended from a machine from which it is passing, around the compensating pulley 81 onto the hub 72 of the receiving reel 73. The drive clutch element 21 is rotatably driven by the drive sprocket 18 which is revolved by means of the sprocket chain 19. The driven clutch element 27 being held resiliently in engagement with the drive clutch element 21 by means of the pivot arm 50 and the tension spring 64 is rotatably driven by the drive clutch element 21. The shaft 13 is driven by the driven clutch element 27 by means of the key 31. The receiving reel 73 is rotated with the shaft 13 and the film 85 is wound thereon.

From the drawings it will be seen that the weight of the compensating pulley 81 and the compensating arm 77 is supported by the film 85. When the tension of the film 85 increases the pulley and arm 81 and 77 are raised, and when the tension in the film 85 decreases the pulley and arm 81 and 77 are lowered. When the tension in the film 85 increases above normal the compensating pulley 81 and the compensating lever 77 are raised and an upper end 130 of the rod 88 engages a face 131 of the clevis 90, thus swinging the clevis and the left end of the lever 91 upwardly, which swings the right end of the arm 105 downwardly through the shaft 93. This moves the connector 107 downwardly, swinging the left end of the toggle link 109 therewith. When this occurs the toggle links 109 and 115 are brought nearer to alignment and the right end of the toggle link 109 is moved outwardly. This swings the upper end of the pivot lever 50 to the right against the action of the tension spring 64, which reduces the frictional engagement between the drive clutch element 21 and the driven clutch element 27. When this occurs there is slippage between these clutch elements and the shaft 13 is driven at a slower rate of speed. The film 85 is therefore wound at a slower rate of speed and is allowed to return to normal tension. As the tension decreases in the film 85 the compensating mechanism is lowered, thus allowing the mechanism connecting between the rod 88 and the pivot arm 50 to move towards normal position. The spring 64 moves the pivot arm 50 to the left a distance in accordance with the movement of the other parts of the device and permits an engagement of greater friction between the drive and driven clutch elements 21 and 27, resulting in a driving of the shaft 13 at a slightly higher rate of speed. The film 85 is at this time wound at a faster rate of speed on the receiving reel 73.

In practice it is found desirable to adjust the film winding machine of my invention so that the normal operating tension of the film 85 retains the rod 88 in engagement with the face 131 of the clevis 90 and actuates the clutch throwout mechanism a very slight amount. Then if the tension in the film 85 decreases the clutch element 27 will move into greater frictional contact with the element 21 and will then drive the reel 73 by means of the shaft 13 at its maximum speed, thus returning the film 85 to normal tension. As the winding diameter of the film 85 on the reel 72 increases it is necessary to slow down the rotational speed of the reel so that the winding speed of the film may be kept uniform. As the winding diameter of the film increases there is a tendency for the film to be wound at a faster speed and the tension of the film is increased. When this occurs the pulley 81 is elevated and the mechanism connected between it and the clutch is operated to reduce the friction of engagement between the drive and driven clutch elements 21 and 27, thus allowing the shaft 13 and the reel 72 to rotate at a slower speed, so that the film 85 may be wound on the reel 72 at a uniform speed. I find that the toggle joint is very satisfactory for operating the pivot arm 50. The horizontal movement of the right end of the central link 109 is very small as compared with the vertical movement of the left end of the link 109, and the movement of the clutch element 27 is very small as compared with the movement of the tension compensating mechanism comprising the pulley and arm 81 and 77. This toggle arrangement also gives a very accurate and uniform movement to the movable clutch element 27.

From the foregoing description of my invention it will be seen that when my device is used in conjunction with any film machine or any machine handling a similar strip, there will be no trouble due to improper winding of the film as it passes from this machine. My invention automatically operates in synchronism with the speed of the film and winds the film on a receiving reel at a speed which agrees with the normal tension of the film and it retains the film at this normal tension.

I claim as my invention:

1. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a spool over which the film passes, and a telescoping connection between the spool and the means for driving the shaft for permitting relative movement between said spool and said drive means during the operation of said device.

2. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a spool over which the film passes, and a connection between the spool and the means for driving the shaft comprising a tube, and a rod secured to the spool and slidable in the tube.

3. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a spool over which the film passes, and a connection between the spool and the means for driving the shaft comprising a clevis, a tube carried by the clevis, and a rod secured to the spool being slidable in the tube and its upper end being adapted to engage the clevis when the spool is moved a predetermined distance from normal position by the film.

4. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a pivot arm comprised of a pair of bars bent to form a substantially cylindrical yoke, said yoke being associated with the driving means for varying the tension of same, and means connecting between the film and the pivot arm.

5. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a spool over which the film passes, a toggle link assembly, a telescoping connection between the spool and the toggle link assembly, a yoke associated with the driving means for varying the tension of same, and a pivot arm for carrying the yoke, this pivot arm being pivotally mounted at one end and pivotally connected with the toggle link assembly at the other end.

6. In a film winding device comprising a receiving reel, a rotatable shaft on which the receiving reel is secured, and means for driving the shaft, means operated by a film being wound on the receiving reel for causing the driving means to drive the receiving reel by means of the shaft at a speed congruent with a normal tension of the film, this last named means including a spool over which the film passes, a toggle link assembly, a connection between the spool and the toggle link assembly, a yoke associated with the driving means for varying the tension of same, and a pivot arm for carrying the yoke, this pivot arm being pivotally mounted at one end and pivotally connected with the toggle link assembly at the other end.

In testimony whereof, I have hereunto set my hand at Los Angeles, California, this 16th day of July, 1925.

FRANK E. GARBUTT.